(12) United States Patent
Robinson et al.

(10) Patent No.: US 9,213,913 B1
(45) Date of Patent: Dec. 15, 2015

(54) RAPID ITERATIVE DETECTION (RID)

(71) Applicant: Raytheon Company, Waltham, MA (US)

(72) Inventors: Ian S. Robinson, Redondo Beach, CA (US); Bradley Flanders, Whittier, CA (US); Anthony Sommese, Northport, NY (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/561,873

(22) Filed: Dec. 5, 2014

(51) Int. Cl.
| | |
|---|---|
| G06K 9/00 | (2006.01) |
| G06K 9/46 | (2006.01) |
| G06K 7/14 | (2006.01) |
| G06K 9/40 | (2006.01) |
| G06T 5/20 | (2006.01) |
| G06K 9/62 | (2006.01) |
| G06F 17/16 | (2006.01) |

(52) U.S. Cl.
CPC ........ *G06K 9/46* (2013.01); *G06F 17/16* (2013.01); *G06K 7/146* (2013.01); *G06K 9/0063* (2013.01); *G06K 9/00557* (2013.01); *G06K 9/40* (2013.01); *G06K 9/6232* (2013.01); *G06T 5/20* (2013.01); *G06K 2009/00644* (2013.01); *G06K 2009/4657* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 7,194,111 B1 * | 3/2007 | Schaum et al. | ............... | 382/103 |
| 8,315,472 B2 * | 11/2012 | Robinson et al. | ............. | 382/254 |
| 8,675,989 B2 * | 3/2014 | Robinson et al. | ............. | 382/276 |
| 8,948,540 B2 * | 2/2015 | Robinson et al. | ............. | 382/276 |
| 8,995,722 B2 * | 3/2015 | Flanders et al. | ............. | 382/103 |
| 9,031,354 B2 * | 5/2015 | Robinson | ....................... | 382/275 |
| 9,064,308 B2 * | 6/2015 | Flanders et al. | ...................... | 1/1 |
| 2002/0012451 A1 * | 1/2002 | Lin | ............................... | 382/103 |
| 2002/0193971 A1 * | 12/2002 | Whitsitt et al. | ............... | 702/189 |
| 2009/0074297 A1 * | 3/2009 | Robinson | ...................... | 382/191 |
| 2010/0303371 A1 * | 12/2010 | Robinson et al. | ............. | 382/254 |
| 2012/0224782 A1 * | 9/2012 | Robinson et al. | ............. | 382/254 |
| 2013/0044963 A1 * | 2/2013 | Robinson et al. | ............. | 382/260 |

OTHER PUBLICATIONS

Hyperspectral Image processing—Applications, Manolakis et al., Lincoln laboratory journal., vol. 14, No. 1,2003, pp. 79-116.*

* cited by examiner

*Primary Examiner* — Jayesh A Patel
(74) *Attorney, Agent, or Firm* — Burns & Levinson LLP; Joseph M. Maraia (57) ABSTRACT

A rapid target detection approach with corresponding method and system to detect targets in scene pixels, efficiently, is presented. The approach includes tailoring an approximation of a target score for each scene pixel, individually, based on an "intermediate target score." The intermediate target score includes a portion of the terms used to compute the target score. The portion is selected by computing a signal-to-clutter ratio (SCR) for a spectral reference associated with a target and ranking the terms by their contribution to the SCR. Scene pixels with low intermediate target scores are removed from further processing. The remaining scene pixels are further processed, including computing target scores to detect targets in these scene pixel. Advantageously, examples of the approach process a few terms of all scene pixels, eliminate most scene pixels, and calculate more terms on high target scoring scene pixels as needed.

20 Claims, 6 Drawing Sheets

FIG. 6

RAPID ITERATIVE DETECTION (RID)

CROSS REFERENCE TO RELATED APPLICATIONS

This application is related to U.S. application Ser. No. 13/959,335, filed Aug. 5, 2013, entitled "Sparse Reduced (SPARE) Filter." The entire teachings of the above application are incorporated herein for all purposes.

BACKGROUND

In many conventional image processing scenarios comprising hyperspectral imaging (HSI) systems, hyperspectral sensors collect data of an image or scene from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial or scene pixel. This scene pixel represents a given spot on the ground in a cross-scan direction for one of the lines at a given time in the scan direction. These spectra are analyzed to detect targets.

SUMMARY

In accordance with an example, a method for detecting a target in a scene pixel of a hyperspectral scene is provided, which enables target detection with fewer computations. The target has a spectrum similar to a known spectral reference. The method includes, in a target detector provided with hyperspectral imaging data for a plurality of scene pixels of a hyperspectral scene and one or more spectral references each corresponding to a target, wherein the hyperspectral imaging data being provided from a hyperspectral sensor and a given spectral references includes a full set of terms representing spectrum whitened by transforming the spectrum using a spectral covariance of the hyperspectral scene, and wherein each term is indexed by an eigenvector and eigenvalue of the spectral covariance used to calculate that term, for a given spectral reference computing a signal-to-clutter ratio (SCR) including a full set of SCR terms, the SCR represents the probability of detecting a target corresponding to the spectral reference in the hyperspectral scene. The method further includes ranking the full set of SCR terms based on the contribution of each of the SCR terms to the computed SCR. The method further includes selecting indices of eigenvalues that correspond to a portion of the full set of SCR terms, based on the ranking. The method further includes with respect to the given spectral reference, for each scene pixel in the plurality of scene pixels, calculating a partial whitened scene pixel spectrum including terms with the selected eigenvalue indices, computing an intermediate target score using a target score equation including the terms of the partial whitened scene pixel spectrum and terms of the whitened spectral reference spectrum with the selected eigenvalue indices, and comparing the intermediate target scores to a threshold. The method further includes identifying scene pixels having intermediate target scores less than the threshold as empty scene pixels that do not include targets. The method further includes if a number of empty scene pixels is less than a specified fraction of a total number of scene pixels and a number of intermediate target scores computed is less than a counter, then updating the partial whitened scene pixel spectrum calculation to include a term with an eigenvalue index previously not selected and updating the target score equation to include terms of the updated partial whitened scene pixel spectrum and terms of the whitened spectral reference spectrum to form an updated target score equation. The method further includes for each scene pixel remaining in the plurality of scene pixels, computing an updated intermediate target score using the updated target score equation and comparing the updated intermediate target scores to an updated threshold, the updated threshold being greater in value than the previously used threshold. The method further includes identifying scene pixels having updated intermediate target scores less than the updated threshold as empty scene pixels that do not include targets. The method further includes if the number of empty scene pixels is greater than or equal to the specified fraction of the total number of scene pixels or the number of intermediate target scores computed is greater than or equal to the counter, for each scene pixel remaining in the plurality of scene pixels, computing a full dimension target score based on a full dimension target score equation including a full set of terms. The method further includes declaring which scene pixels include targets corresponding to the given spectral reference based on comparisons of the computed full dimension target score to a full dimension target score threshold, the full dimension target score threshold being greater in value than the threshold and the updated threshold.

In accordance with another example, a system for detecting a target in a scene pixel of a hyperspectral scene is provided, which enables target detection with fewer computations. The target has a spectrum similar to a known spectral reference. The system includes a memory having computer executable instructions thereupon and at least one interface receiving a hyperspectral imaging data for a plurality of scene pixels of a hyperspectral scene and one or more spectral references each corresponding to a target, wherein the hyperspectral imaging data being provided from a hyperspectral sensor and a given spectral references includes a full set of terms representing spectrum whitened by transforming the spectrum using a spectral covariance of the hyperspectral scene, and wherein each term is indexed by an eigenvector and eigenvalue of the spectral covariance used to calculate that term. The system further includes a target detector coupled to the memory and the at least one interface. The computer executable instructions when executed by the target detector cause the target detector to, for a given spectral reference, compute a signal-to-clutter ratio (SCR) including a full set of SCR terms, the SCR represents the probability of detecting a target corresponding to the spectral reference in the hyperspectral scene and rank the full set of SCR terms based on the contribution of each of the SCR terms to the computed SCR. The target detector further caused to select indices of eigenvalues that correspond to a portion of the full set of SCR terms, based on the ranking. The target detector further caused to with respect to the given spectral reference, for each scene pixel in the plurality of scene pixels, calculate a partial whitened scene pixel spectrum including terms with the selected eigenvalue indices and compute an intermediate target score using a target score equation including the terms of the partial whitened scene pixel spectrum and terms of the whitened spectral reference spectrum with the selected eigenvalue indices. The target detector further caused to compare the intermediate target scores to a threshold. The target detector further caused to identify scene pixels having intermediate target scores less than the threshold as empty scene pixels that do not include targets. The target detector further caused to if a number of empty scene pixels is less than a specified fraction of a total number of scene pixels and a number of intermediate target scores computed is less than a counter, then update the partial whitened scene pixel spectrum calculation to include a term with an eigenvalue index previously not selected and update the target score equation to include terms of the updated partial whitened scene pixel spectrum and terms of the whitened spectral reference spectrum to form an updated target score equation. The target detector further caused to for each scene pixel remaining in the plurality of scene pixels, compute an updated intermediate target score using the updated target score equation and compare the updated intermediate target scores to an updated threshold, the updated threshold being greater in value than the previously used threshold. The target detector further caused to identify scene pixels having updated intermediate target scores less than the updated threshold as empty scene pixels that do not include targets. The target detector further caused to if the number of empty scene pixels is greater than or equal to the specified fraction of the total number of scene pixels or the number of intermediate target scores computed is greater than or equal to the counter, for each scene pixel remaining in the plurality of scene pixels, compute a full dimension target score based on a full dimension target score equation including a full set of terms. The target detector further caused to declare which scene pixels include targets corresponding to the given spectral reference based on comparisons of the computed full dimension target score to a full dimension target score threshold, the full dimension target score threshold being greater in value than the threshold and the updated threshold.

In accordance with yet another example, a tangible computer-readable storage medium having computer readable instructions stored therein for detecting an target in a scene pixel of a hyperspectral scene is provided, which enables target detection with fewer computations. The target has a spectrum similar to a known spectral reference. The computer readable instructions when executed by one or more processors provided with a hyperspectral imaging data for a plurality of scene pixels of a hyperspectral scene and one or more spectral references each corresponding to a target, wherein hyperspectral imaging data being provided from a hyperspectral sensor and a given spectral references includes a full set of terms representing spectrum whitened by transforming the spectrum using a spectral covariance of the hyperspectral scene, and wherein each term is indexed by an eigenvector and eigenvalue of the spectral covariance used to calculate that term, cause the one or more processors to for a given spectral reference compute a signal-to-clutter ratio (SCR) including a full set of SCR terms, the SCR represents the probability of detecting a target corresponding to the spectral reference in the hyperspectral scene. The one or more processors further caused to rank the full set of SCR terms based on the contribution of each of the SCR terms to the computed SCR. The one or more processors further caused to select indices of eigenvalues that correspond to a portion of the full set of SCR terms, based on the ranking. The one or more processors further caused to with respect to the given spectral reference, for each scene pixel in the plurality of scene pixels calculate a partial whitened scene pixel spectrum including terms with the selected eigenvalue indices and compute an intermediate target score using a target score equation including the terms of the partial whitened scene pixel spectrum and terms of the whitened spectral reference spectrum with the selected eigenvalue indices. The one or more processors further caused to compare the intermediate target scores to a threshold and identify scene pixels having intermediate target scores less than the threshold as empty scene pixels that do not include targets. The one or more processors further caused to if a number of empty scene pixels is less than a specified fraction of a total number of scene pixels and a number of intermediate target scores computed is less than a counter, then update the partial whitened scene pixel spectrum calculation to include a term with an eigenvalue index previously not selected and update the target score equation to include terms of the updated partial whitened scene pixel spectrum and terms of the whitened spectral reference spectrum to form an updated target score equation. The one or more processors further caused to for each scene pixel remaining in the plurality of scene pixels, compute an updated intermediate target score using the updated target score equation. The one or more processors further caused to compare the updated intermediate target scores to an updated threshold, the updated threshold being greater in value than the previously used threshold. The one or more processors further caused to identify scene pixels having updated intermediate target scores less than the updated threshold as empty scene pixels that do not include targets. The one or more processors further caused to if the number of empty scene pixels is greater than or equal to the specified fraction of the total number of scene pixels or the number of intermediate target scores computed is greater than or equal to the counter, for each scene pixel remaining in the plurality of scene pixels, compute a full dimension target score based on a full dimension target score equation including a full set of terms. The one or more processors further caused to declare which scene pixels include targets corresponding to the given spectral reference based on comparisons of the computed full dimension target score to a full dimension target score threshold, the full dimension target score threshold being greater in value than the threshold and the updated threshold.

In some examples, any of the aspects above can include one or more of the following features.

In other examples of the method, the hyperspectral imaging data includes M principal components of the hyperspectral scene. The method includes computing the intermediate target score from a subset of the M principal components, the remaining principal components are not used to compute the intermediate target score, updating the target equation includes updating the target equation to include one or more of the unused principal components to form the updated target equation, and computing the full dimension target score includes computing the full dimension target score based on the M principal components.

In some examples of the method, the hyperspectral imaging data includes a plurality of average bands, which are derived by averaging the HSI spectrum of each scene pixel in the plurality of scene pixels. The method includes computing the intermediate target score from a subset of the plurality of average bands, the remaining average bands are not used to compute the intermediate target score, updating the target equation to include one or more of the average bands to form the updated target equation, and computing the full dimension target score based on the plurality of average bands.

In other examples of the method, the hyperspectral imaging data includes N coefficients for each scene pixel, which are derived by unmixing N basis vectors from a spectral vector associated each scene pixel. The method includes computing the intermediate target score from a subset of the N coefficients, the remaining coefficients are not used to compute the intermediate target score, updating the target equation to include one or more of the unused coefficients to form the updated target equation, and computing the full dimension target score based on the N coefficients.

Some examples of the method further include, given a plurality of spectral references each associated with a full set of SCR terms and a ranking of those terms based on their contribution to the total SCR for that reference, finding a union of the eigenvalue indices selected for the plurality of spectral references. The union of selected eigenvalue indices corresponds to a portion of the full sets of SCR terms. In these examples, the partial whitened spectrum calculation for each scene pixel in the plurality of scene pixels includes terms associated the union of selected eigenvalue indices. The intermediate target score computation for each scene pixel in the plurality of scene pixels, with respect to a given spectral reference, includes terms of the partial whitened spectrum for a subject scene pixel and terms of the whitened spectrum for the given spectral reference associated with the union of selected eigenvalue indices.

Other examples of the method further include, given a plurality of spectral references each associated with a full set of SCR terms and a ranking of those terms based on their contribution to the total SCR for that reference, finding a union of the eigenvalue indices selected for the plurality of spectral references, the union of selected eigenvalue indices corresponding to a portion of the full sets of SCR terms. In these examples, the partial whitened spectrum calculation for each scene pixel in the plurality of scene pixels includes terms associated the union of selected eigenvalue indices. The intermediate target score computation for each scene pixel in the plurality of scene pixels, with respect to a given spectral reference, includes a portion of terms of the partial whitened spectrum for a subject scene pixel that match the terms of the whitened spectrum for the given spectral reference associated with the selected eigenvalue indices for that spectral reference.

Some examples of the method further include eliminating the empty scene pixels from the plurality of scene pixels.

Other examples of the method further include revising the intermediate target score to form a revised target score and wherein comparing includes comparing the revised target score to a varying threshold. The varying threshold is based, at least in part, on a portion of the full set of SCR terms not yet evaluated.

In some examples of the method, revising the intermediate target includes approximating the unevaluated terms of the target equation to form a score corresponding with unevaluated terms and adding the score to the intermediate target score to form the revised target score.

In other examples of the method, revising the intermediate target includes calculating an upper bound of the unevaluated terms of the target equation, adding the upper bound to the intermediate target score to form the revised target score, and comparing the revised target score to a threshold used to compare a full dimension target score.

In some examples of the system, given a plurality of spectral references each associated with a full set of SCR terms and a ranking of those terms based on their contribution to the total SCR for that reference, the target detector is further caused to find a union of the eigenvalue indices selected for the plurality of spectral references. The union of selected eigenvalue indices corresponding to a portion of the full sets of SCR terms. In these examples, the partial whitened spectrum calculation for each scene pixel in the plurality of scene pixels includes terms associated the union of selected eigenvalue indices. In these examples, the intermediate target score computation for each scene pixel in the plurality of scene pixels, with respect to a given spectral reference, includes a portion of the terms of the partial whitened spectrum for a subject scene pixel that match the terms of the whitened spectrum for the given spectral reference associated with the selected eigenvalue indices.

In some examples of the system, the target detector is further caused to eliminate the empty scene pixels from the plurality of scene pixels.

In other examples of the system, the target detector is further caused to revise the intermediate target score to form a revised target score and wherein comparing includes comparing the revised target score to the threshold.

In some examples of the tangible non-transitory computer-readable storage medium, given a plurality of spectral references each associated with a full set of SCR terms, the one or more processors further caused to find a union of the eigenvalue indices selected for the plurality of spectral references. The union of selected eigenvalue indices corresponding to a portion of the full sets of SCR terms. In these examples, the partial whitened spectrum calculation for each scene pixel in the plurality of scene pixels includes terms associated the union of selected eigenvalue indices. In these examples, the intermediate target score computation for each scene pixel in the plurality of scene pixels, with respect to a given spectral reference, includes a portion of the terms of the partial whitened spectrum for a subject scene pixel that match the terms of the whitened spectrum for the given spectral reference associated with the selected eigenvalue indices.

In some examples of the tangible non-transitory computer-readable storage medium, the one or more processors is further caused to eliminate the empty scene pixels from the plurality of scene pixels.

In other examples of the tangible non-transitory computer-readable storage medium, the one or more processors is further caused to revise the intermediate target score to form a revised target score and wherein comparing includes comparing the revised target score to the threshold.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Figure 1:
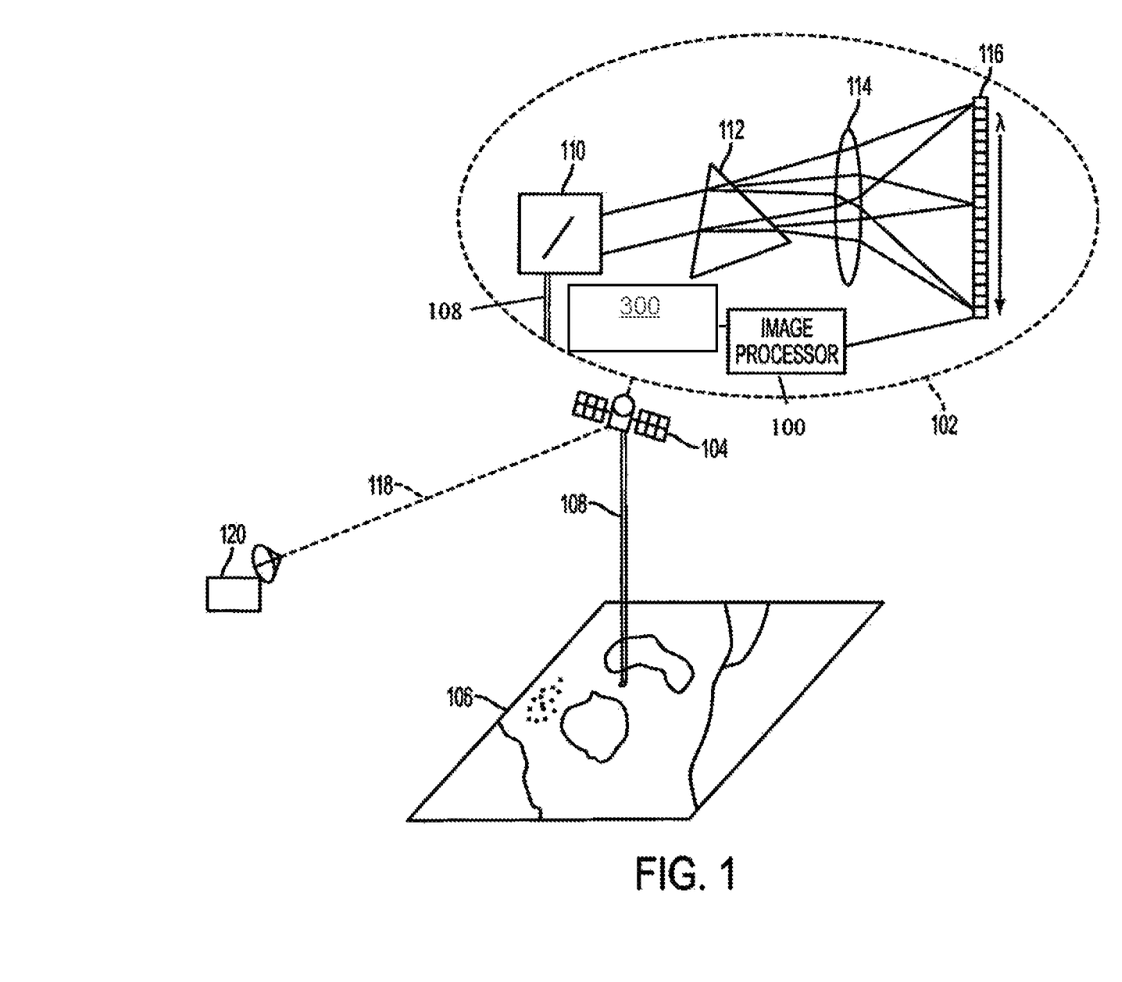
FIG. 1 is an illustration of an example imaging system with a target detector.

Depicted in FIG. 1 is an example of imaging system 102 that is configured to process images and to detect materials/targets/anomalies in backgrounds/scenes. By way of example only, imaging system 102 may be a hyperspectral imaging (HSI) system. The term "hyperspectral" refers to imaging narrow spectral bands over a continuous spectral range, and producing the spectra of all scene pixels in a hyperspectral scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image (HSI) scene to image processor 100. In an example, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106.

Figure 2:
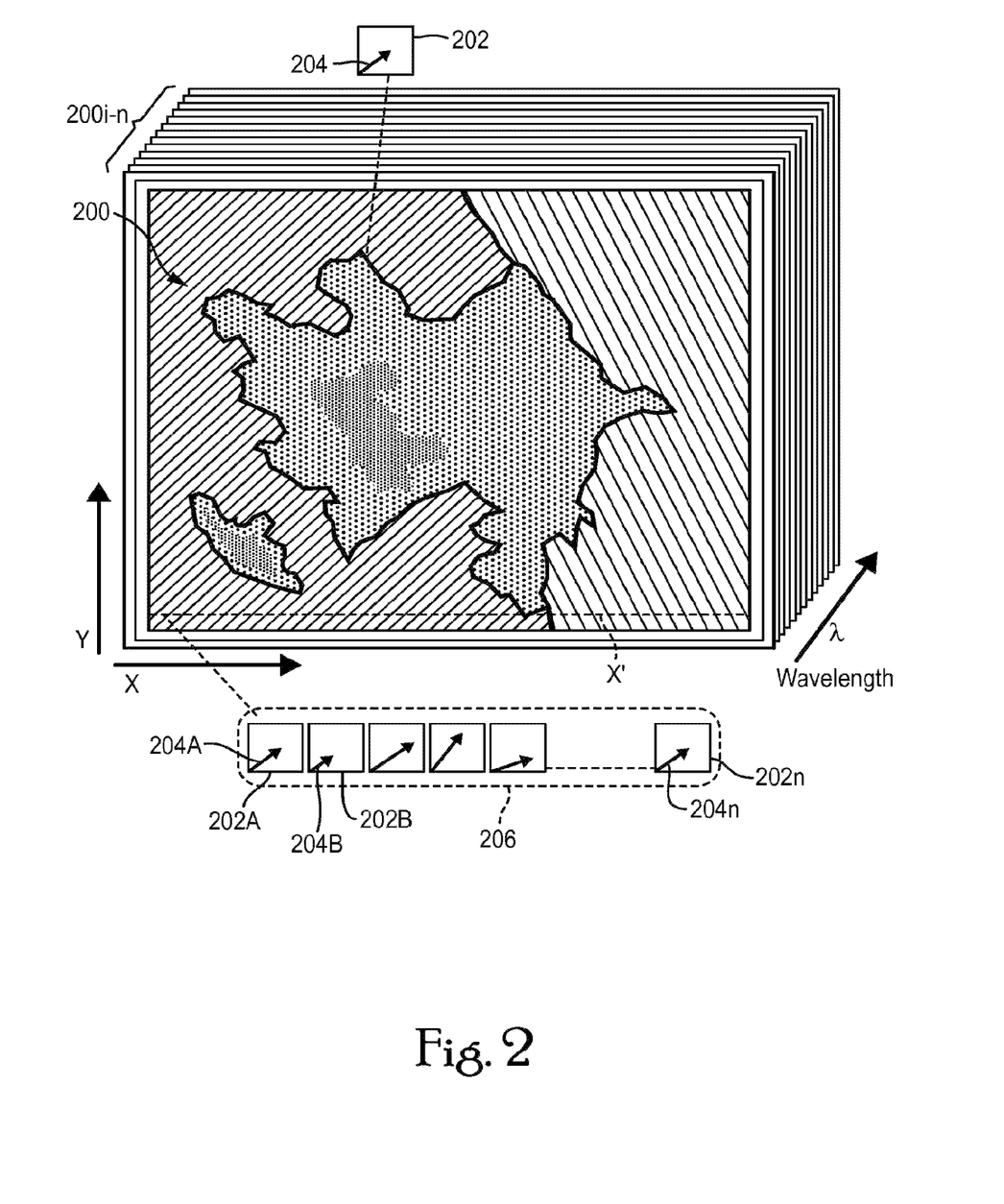
FIG. 2 is an illustration of an example representation of one or more images of a hyperspectral scene including a plurality of scene pixels.

FIG. 2 provides an exemplary representation of hyperspectral image 200, which may generally include a plurality of images 200$i$-$n$, which may be acquired in a substantially simultaneous manner across various different wavelength ($\lambda$) bands. As shown in FIG. 2, the hyperspectral image 200 may include a plurality of scene pixels 202 arranged according to an x-y coordinate system, although it will be apparent that alternate coordinate systems may be employed in various circumstances. (A scene pixel can also be referred to as "spatial pixel" or simply "pixel," all of which may be used interchangeably herein.) In one example, each respective scene pixel 202 may have a spectral vector 204 associated therewith, wherein the spectral vector 204 may contain one or more spectral measurements representing energy associated with the respective scene pixel 202. For example, FIG. 2 further illustrates an enlarged section 206 representing a particular row X' of scene pixels 202$a$-$n$ from one of the plurality of images 200$i$-$n$, wherein each of the various scene pixels 202$a$-$n$ in the row X' may have a spectral vector 204$a$-$n$ representing the energy associated with the respective pixel 202.

A key function of a HSI system is detecting targets in scene pixels making up a hyperspectral scene. Detecting a target requires the unique spectrum or "signature" associated with the target to be known beforehand. Target detection is a critical to the operation of a HSI system in a denied territory.

A common form of target detector is the spectral Matched Filter or "MF" target detection filter. (See equation 1.) A matched filter score or "score" is computed, in part, from the unique spectrum of the spectral reference. A target has a high matched filter score.

$$MF = \frac{(x-\mu)^T \text{Cov}^{-1}(s-\mu)}{\sqrt{(s-\mu)^T \text{Cov}^{-1}(s-\mu)}} \quad (1)$$

Where $x$ is the pixel spectral vector, and $s$ is the reference spectra

The scene mean spectra is $\mu$, and covariance Cov

The most commonly used form of MF uses eigenvectors and eigenvalues of the covariance matrix of the HSI data. (See equation 2.) The eigenvectors are also known as Principal Components.

$$MF = \frac{\sum_{i=1}^{D} \frac{p_i t_i}{\lambda_i}}{\sqrt{SCR}} \quad (2)$$

where $p_i = (E_i)^T(x-\mu)$ and $t_i = (E_i)^T(s-\mu)$

Where eigenvalues are denoted as, $\lambda_i$ and eigenvectors as, $E_i$ $$\text{Where } SCR = \sum_{i=1}^{D} \frac{t_i^2}{\lambda_i}$$

The MF approach is effective but requires a lot of computation for each scene pixel. Computation of the MF target detection filter for all scene pixels requires P*D^2 operations, where P is the number scene pixels and D is the number of dimensions or bands. A hyperspectral scene typically includes 1E6 scene pixels. A HSI sensor typically collects 200-400 narrow spectral bands over a given sensing regime (e.g., visible and near infra-red (VNIR)/short wave infrared (SWIR) and long wave infrared (LWIR)). Therefore, target detection is ordinarily a very computation intensive process.

Figure 3:
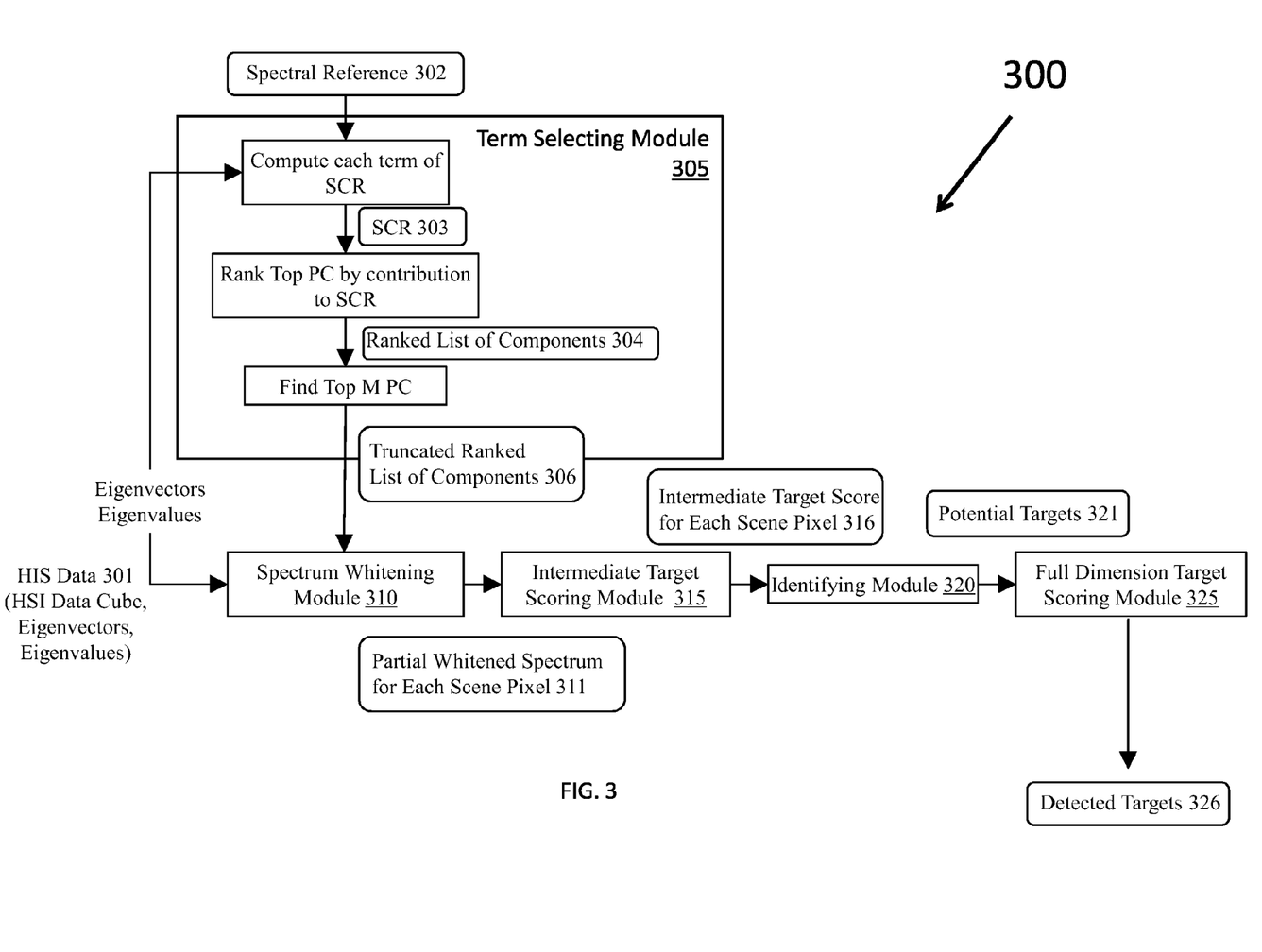
FIG. 3 is a functional block diagram of an example of the target detector.

As shown, the imaging system 102 includes a target detector 300 for detecting targets in scene pixels making up a hyperspectral scene. However, it may not be practical for the target detector 300 to perform so many operations, as described above, to detect a target, especially when the target detector 300 is located "on-board" the remote imaging system 104. It may also not be practical to perform this many operations "on-ground." A ground station may have to process up to several terabytes of data per day.

A rapid iterative detection or RID approach is presented to efficiently detect targets in scene pixels making up a hyperspectral scene. The approach includes tailoring an approximation of a target score for each scene pixel, individually, based on the "intermediate target score." The intermediate target score is computed using a portion of the terms used to compute a target score, herein referred to as a "full dimension target score" The target score computed by the MF target detection filter described above is an example of a full dimension target score.

The intermediate target score is the sum using a few terms of the eigenvectors and eigenvalues in the numerator. Note that the denominator, SCR, is the same for every pixel and is computed once for each scene and reference spectrum. This is beneficial because the SCR is computed in the full dimension with little processing. By computing the SCR in the full dimension the top PC contributions can be ranked. As described later in greater detail, ranking the contributions is used in selecting which terms form the intermediate target score.

An Adaptive Coherence Estimator (ACE) is another example of a full dimension target score, or a slight variant (RACE) using the signed square root of the standard ACE. (See equation 3.) The score is referred to by either name where the C could be either coherence or cosine.

$$RACE = \frac{(x-\mu)^T \text{Cov}^{-1}(s-\mu)}{\sqrt{(x-\mu)^T \text{Cov}^{-1}(x-\mu)} \sqrt{(s-\mu)^T \text{Cov}^{-1}(s-\mu)}} \quad (3)$$

The numerator is the same as MF but the denominator incorporates the Reed-Xioli (RX) anomaly measure. Like MF, ACE/RACE also requires a lot of computation for each pixel. In fact, ACE/RACE requires more computation because the RX calculation in the denominator must be done for every pixel. Both MF and ACE/RACE are often used together, because the false alarms tend to be different. An additional processing speed improvement is to defer calculation of RX and ACE/RACE until most of the pixels have been eliminated, and only calculate it for pixels with high MF scores.

The approach further includes focusing the tailoring of the processing to eliminate scene pixels with low target scores from further processing. Because most scene pixels in a hyperspectral scene have low target scores, with only few having high target scores, a large number of scene pixels can be removed from processing making further processing more efficient. Studies have shown that fewer terms in a target score expression (e.g., the MF target detection filter equation described above) are needed to identify low target scoring scene pixels than are needed to identify high target scoring pixels. Advantageously, examples of the RID approach process a few terms of all scene pixels, eliminate most scene pixels, and calculate more terms on high target scoring scene pixels (e.g., the remaining scene pixels) as needed.

In general, examples of the RID approach divide the target detection problem into three stages. First, terms are selected to form an intermediate target filter (e.g., a target equation with a few terms). The intermediate target filter is applied to all scene pixels in a plurality of scene pixels to produce an intermediate target score for each scene pixel. Several ways for implementing this intermediate stage are described below.

The intermediate target score is different from the full dimension target score. The full dimension target score is used to detect a scene pixel with a target. In contrast, the intermediate target score is used to detect a scene pixel without a target. Scene pixels having intermediate target scores below a threshold are declared "empty scene pixels" and are not processed further.

To aid in identifying empty scene pixels, in some examples of the RID approach, an optional step is included for estimating the contribution of the un-used terms in the full dimension target score with few computations. This estimation could consist of an upper bound of a full dimension target score or an estimate of the full dimension target score. If an estimate of the full dimension target score is calculated, scene pixels that are close to the threshold but have estimated full dimension scores below a second, higher threshold are also declared empty scene pixels. If an upper bound of the full dimension score is calculated, the resulting score can be compared to the threshold used by full dimension target processing without risk of missing any targets.

Having identified which scene pixels of the hyperspectral scene are empty scene pixels, examples of the RID approach apply one or more full dimension target filters (e.g., the MF and ACE target detection filters described above) to the remaining pixels. The results of the filter or combination of filters are thresholded to declare whether or not a target is present in a scene pixel. Operating on a few percent or less of the scene pixels (e.g., 0.1%-2%) saves 50-1000× of the processing steps, depending in part on the number of scene pixels processed.

FIG. 3 shows an example of the target detector 300 for implementing examples of the RID approach. The target detector 300 includes a term selecting module 305, a spectrum whitening module 310, an intermediate target scoring module 315, an identifying module 320, and a full dimension target scoring module 325 communicatively coupled to one another as shown.

The target detector 300 is provided with hyperspectral imaging data 301 for a plurality of scene pixels in a hyperspectral scene. The hyperspectral imaging data 301 includes, for example, a HSI data cube representing the plurality of scene pixels in the hyperspectral scene, and eigenvectors and eigenvalues associated with the input date cube. Some examples of the RID approach calculate the eigenvectors and eigenvalues from the data cube if they are not provided. The target detector 300 is also provided with one or more spectral references each corresponding to a target. A spectrum associated with a given spectral reference is whitened by transforming that spectrum using a spectral covariance of the hyperspectral scene.

Operation of the term selecting module 305 is described with reference to a single spectral reference 302. (Operation on multiple spectral references is discussed later.) The term selecting module 305 computes a signal-to-clutter ratio (SCR) 303 for a given spectral reference. In some examples of the RID approach, the SCR 303 is expressed as the summation shown in equation 4.

$$SCR = \sum_{i=1}^{D} \frac{t_i^2}{\lambda_i} \quad (4)$$

The SCR 303 includes a full set of terms, including magnitudes of the whitened spectrum of the spectral reference. The SCR 303 represents the probability of detecting a target corresponding to the spectral reference in the hyperspectral scene. Because the SCR 303 does not depend on the pixel spectrum, the SCR 303 is calculated once, and requires very little processing even in full dimension.

The term selecting module 305 ranks the full set of terms (eigenvectors) in descending order based on the contribution of each term to the SCR. The result is a ranked list of components 304. The term selecting module 305 then selects from the ranked list of components 304 a portion of the top ranked terms, e.g., the top M terms in which M is specified by the user. The output of the term selecting module 305 is a truncated ranked list of components 306 also referred to as a selected portion of top ranked terms.

The spectrum whitening module 310 calculates for each scene pixel in the plurality of scene pixels (represented by the HSI data cube), a partial whitened spectrum 311. The partial whitened spectrum 311 includes terms corresponding to the selected portion of top ranked terms 306. For example, given the top M terms selected by the term selecting module 305, the spectrum whitening module 310 computes M terms of the whitened pixel spectrum comprising the M highest scoring eigenvectors and eigenvalues from the SCR calculation.

The intermediate target scoring module 315 computes an intermediate target score (partial MF) 316 for each scene pixel in the plurality of scene pixels. For a given scene pixel, the intermediate target scoring module 305 uses the first M terms of the whitened spectrum of the scene pixel 311 and the same M terms of the whitened spectrum of the spectral reference, comprising the highest SCR-valued eigenvectors and eigenvalues. By using M terms instead of the full dimension, D, terms, many fewer mathematical operations are used. The number of operations is reduced by a factor of approximately (D/M) resulting in much faster processing. In some cases, D/M is a factor of 50-100, resulting in 50-100 times fewer operations.

The identifying module 320 compares the intermediate target scores 316 to a threshold. The identifying module 320 declares scene pixels associated with intermediate target scores below the threshold to be not of interest. These pixels are declared empty scene pixels that do not include targets and are flagged for no further processing.

A convenient example of the identifying module 320 eliminates empty scene pixels from the plurality of scene pixels. It is noted, that the value of the threshold for comparing the intermediate target score 316 is smaller than the value of a threshold used for comparing the full dimension target score. The threshold is used to identify, and in some examples, eliminate low target scoring pixels rather than identifying high target scoring pixels.

Scene pixels associated with intermediate target scores above the threshold (i.e., scene pixels remaining in the plurality of scene pixels) potentially include targets, and are further processed by the target detector 300. For sake of discussion and for readability, scene pixels that may include targets are called "potential targets" 321. The full dimension target scoring module 325 calculates for each of the potential targets 321 a full dimension target score. The full dimension target score is based on the full set of terms of the whitened spectrum of the potential target 321 and the full set of terms of the whitened reference spectrum of the spectral reference 302.

Examples of the RID approach compute a full dimension MF score, full dimension ACE score or both full dimension MF and ACE scores for the remaining scene pixels. Because the number of potential targets 321 can be 1% or even 0.1% of the number of pixels, processing only potential targets 321 can reduce the full dimension processing by a factor of 100-1,000. The full dimension target scoring module 325 compares the full dimension target scores associated with the potential targets 321 with a full dimension threshold. Potential targets 321 with full dimension target scores above the full dimension threshold are considered to be scene pixels including the target. The target detector 300 returns these scene pixels or an indicator (e.g., detection 326) that targets are detected in these scene pixels.

Figure 4:
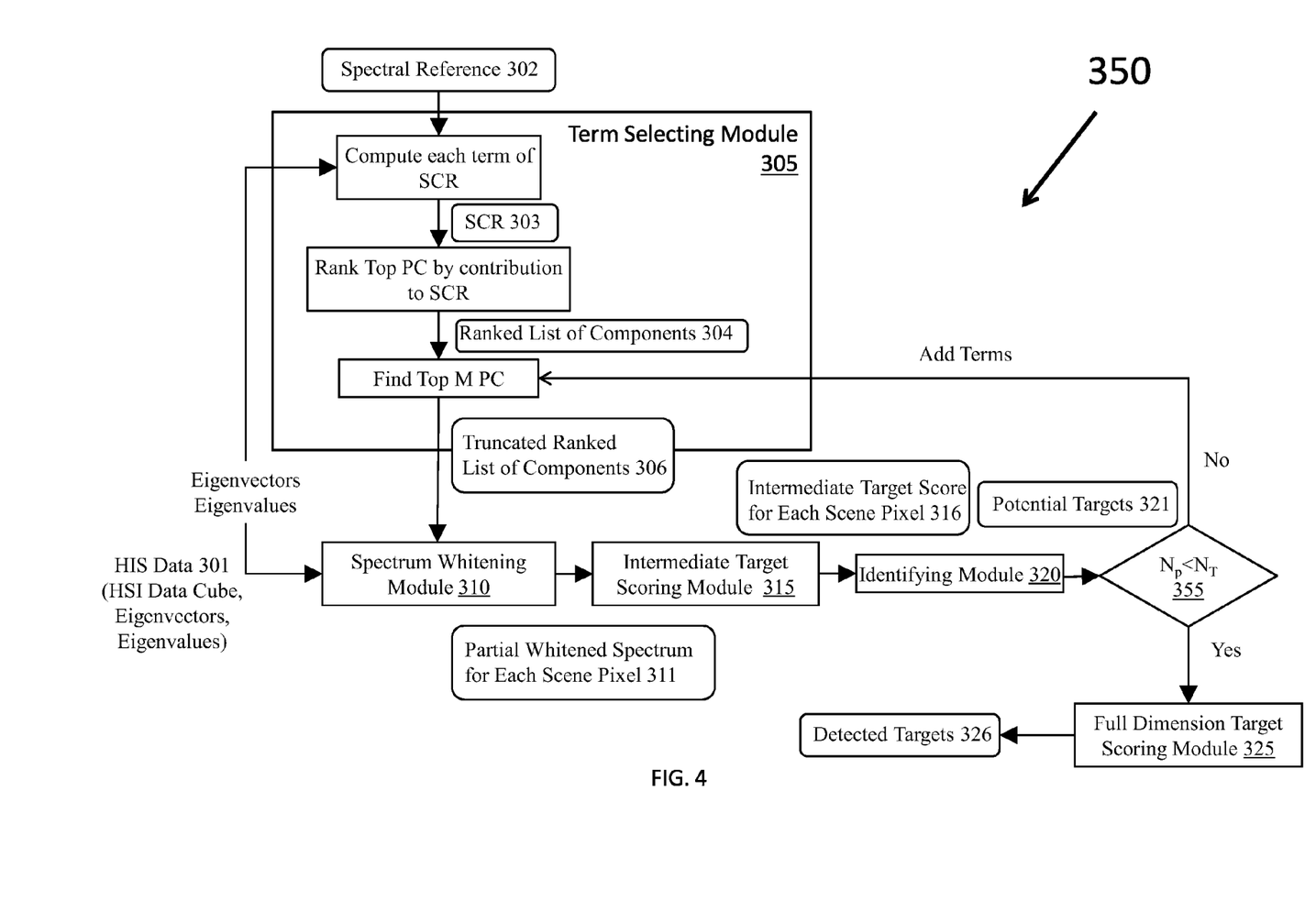
FIG. 4 is a functional block diagram of another example of the target detector that iteratively adds additional terms.

FIG. 4 shows another example of target detector 350 for implementing other examples of the RID approach. These examples start with a smaller number of top PC, and iteratively add additional terms. In addition to the target detector modules described above with reference to FIG. 3, the target detector 350 includes a decision block 355 between the identifying module 320 and the full dimension target scoring module 325. If a number of potential targets (denoted in the figure as $N_p$) is sufficiently small, e.g., as determined by a set number or a set fraction of the plurality of scene pixels are identified as empty scene pixels (denoted in the figure as $N_t$), the full dimension target scoring module 325 calculates a full dimension target score, as described above. Based on a comparison of the full dimension target score to a full dimension threshold, the target detector 350 provides the detection 321, as also described above.

If the number of potential targets is large, the example of the RID approach iterates. The intermediate target scoring module 315 calculates more of the remaining terms of the target score (adding terms to the target equation) and computes an updated intermediate target score for those remaining scene pixels. In this example of the RID approach, the updated intermediate target score is compared to an updated threshold. The identifying module 315 declares scene pixels below the updated threshold to be not of interest. These pixels are declared empty scene pixels that do not include targets and are flagged for no further processing.

A convenient example of the identifying module 315 eliminates empty scene pixels from the plurality of scene pixels. It is noted, that the value of the updated threshold for comparing the updated intermediate target score is higher than the value of the threshold used in the prior iteration but lower than the threshold value used for comparing the full dimension target score.

The foregoing iterative loop continues until sufficiently few scene pixels remain or the target detector 350 executes a maximum number of loops. A counter may be provided (e.g., as an operator defined parameter) or incremented to determine whether sufficiently few scene pixel remain or whether a maximum number of loops is obtained.

The RID approach contemplates several ways of computing the intermediate target score. In a convenient example of the RID approach, provided with M eigenvector coefficients computed for each scene pixel, the intermediate target scoring module 305 computes the intermediate target score from the largest (top) M (e.g. 3-5) principal components of the SCR score. These are the M eigenvectors of the Cov with the largest contribution to the SCR score. If the hyperspectral scene has already been whitened, the computation requires $P*M^2$ number of operations.

If the hyperspectral scene has not been whitened, it may be calculated from the HSI datacube, requiring $P*M*D$ operations. The coefficients are calculated by unmixing the principal components from each scene pixel and dividing the resulting unmixing coefficient by the square root of the eigenvalue corresponding to the eigenvector. The result is each scene pixel has M whitened coefficients.

The intermediate target score is the dot product of the M coefficients with the largest M components of the whitened target reference spectrum, and is equivalent to the output of the target score (target equation) for M coefficients. When M is 3, for example, the foregoing computation requires approximately P*M^2 or 9P operations. The intermediate target score can also be computed by equation 6, in which the eigenvalue is a divisor before summing dot product terms. The advantage to this way of computing the intermediate target score is that enables an upper bound to be estimated on the full dimension target score and will be described later in detail.

Using flight test data, it has been shown that some examples of the RID approach separate pixels with targets from empty pixels with M as low as 3 terms. It has also been show that some examples of the RID approach eliminated over 99% of the scene pixels without any degradation to probability of detection (Pd) and probability of false alarm (Pfa).

In another example of the RID approach the HSI spectrum of each pixel has been averaged and provided as a "multi spectral" data set of average bands (e.g., 5-10). These average bands are the used to create another spectral data cube with fewer dimensions. For example, 3 bands (1-3) are averaged together to form 1 band (the new 1), the next 3 (4-6) are averaged together to form the next band (the new 2), etc.

In this example, the RID approach reduces M by a factor of 3 (K=M/3) which, in turn, reduces the covariance matrix calculation to K×K dimensions, which is faster to calculate than a matrix of M×M dimensions. K principal components are then calculated from the covariance matrix, which again is faster to calculate than M principal components. In this example of the RID approach, the target equation is "rebuilt" to include K terms. The intermediate target scoring module 305 uses the few terms of the K terms with the largest contribution to the SCR to compute the intermediate target score, as described above.

In another example of the RID approach, the HSI spectrum of each scene pixel has been reduced to N coefficients. The unmixing of basis vectors is a common approach to reducing the dimensionality of the incoming data cube. Other approaches are described in U.S. Pat. No. 8,675,989 OPTIMIZED ORTHONORMAL SYSTEM AND METHOD FOR REDUCING DIMENSIONALITY OF HYPERSPECTRAL IMAGES, filed Apr. 13, 2011, which is incorporated herein by reference in its entirety. These dimension reducing approaches have the advantage of discovering N basis vectors while simultaneously reducing each scene pixel to N coefficients and a residual magnitude, requiring approximately P*N*D operation.

In this example of the RID approach, an input data cube is expressed as N dimensional basis vector coefficients rather than D dimensional spectral vectors. A N×N covariance matrix is calculated from the input data cube from which N principal components are computed. The target equation is rebuilt to include N terms, which is typically 3-10. The intermediate target scoring module 305 uses the few terms of the N terms with the largest contribution to the SCR, to compute the intermediate target score, as described above, requiring roughly P*N^2 operations.

Provided D whitened coefficients computed for every scene pixel and target spectral reference, and the dot product of the D principal components of each whitened scene pixel with the whitened target spectral reference, the full dimension target score can be calculated. The full dimension target score, MF, can be written as shown in equation 5 as:

$$MF = \frac{\sum_{i=1}^{D} \frac{p_i t_i}{\lambda_i}}{\sqrt{SCR}} \quad (5)$$

where $p_i$ are principal component coefficients of the pixel $t_i$ are principal component coefficients of the reference spectrum $\lambda_i$ are eigenvalues The intermediate target score, $MF_M$, is obtained by dividing the MF numerator calculated for the top M terms, denoted as $MFNUM_M$, by the square root of the full dimension SCR. (See equation 6.) The top M terms are defined as only the largest M terms of the $SCR_i$.

$$MF_M = \frac{MFNUM_M}{\sqrt{SCR}} \quad (6)$$

$$MFNUM_M = \sum_{i=1}^{M} \frac{p_i t_i}{\lambda_i}$$

$$SCR_i = \frac{t_i^2}{\lambda_i}$$

Turning now to a discussion of thresholds used to compare against intermediate target scores to identify empty scene pixels. Care is needed in selecting an appropriate series of thresholds because the target score of every scene pixel generally increases as each term is added to the intermediate target score. The target score is computed using a target equation that can be expressed as a sum of terms. The intermediate target scoring module 305 computes an intermediate score that is generally less than the full (final) dimension target score. Because the terms are ranked in descending importance to the SCR the most important terms of the MF or ACE generally come first in the target equation. As such, the intermediate target score calculation for most scene pixels starts with the important terms added, and then progressively less important terms added.

However, it is theoretically possible for a scene pixel to have small values of MF for what are usually important terms (large SCR contribution) and then a large value of MF for what is usually a less important term (smaller SCR contribution). In other words, a large increase in the target score may occur way down in a term that is usually small throughout the hyperspectral scene. This creates a risk of incorrectly declaring that a scene pixel does not include a target and missing the target.

In some examples of the RID approach, the threshold includes a safety margin. With this safety margin, the threshold is safely below the full (final) dimension target score threshold, just in case one of the later (less important) terms that has not be evaluated yet is unexpectedly large in value. In these examples, as more terms are evaluated, the threshold increases towards to the full (final) dimension target score threshold because a smaller safety margin is needed for unexpectedly large terms.

Other examples of the RID approach further reduce the risk of missing targets at the cost of added calculations. In each of these examples, the score revising module 310 revises an intermediate target score resulting in a revised intermediate target score. Instead of comparing the intermediate target score directly to a threshold, the identifying module 315 compares the revised intermediate target scores to a threshold.

One example of the score revising module 310 approximates all unevaluated terms of the target score to obtain an estimate of their target score. Adding this estimated term to the intermediate target score gives an estimate of the full dimension target score, $MF_{EST}$. (See equation 7.) The identifying module 315 compares the estimate ($MF_{EST}$) to a threshold at each loop to eliminate certain pixels and select pixels for continued evaluation.

$$MF_{EST} = \frac{MFNUM_{EST}}{\sqrt{SCR}} \quad (7)$$

where $MFNUM_{EST} = MF_M + \frac{e^2}{\bar{\lambda}}$ where $\bar{\lambda} = \frac{\sum_{i=M+1}^{D} \lambda_i}{(D-M)}$ and $e^2 = \sum_{i=M+1}^{D} p_i^2 = X^2 - \sum_{i=1}^{M} p_i^2$ and $$X^2 = \sum_{i=1}^{D} (x_i - \mu_i)^2$$

In this example, the threshold changes slightly with each iteration to account for decreasing uncertainty in the target score rather than changing to account for an increasing intermediate target score, as in the case of the safety margin example described above. In a convenient example of the RID approach, a "varying" threshold is based on a portion of the full set of SCR terms not yet evaluated, in particular, the relative size of the associated terms of the SCR. The varying threshold may also be based on information gathered or determined, previously, when processing HSI data that is similar to the HSI data being processed, currently. Advantageously, the varying threshold may be changed based on past experiences.

The exact sum of the unevaluated terms is unknown but the sum of the terms is approximately known. As such, in this example of the RID approach, a safety margin for a threshold can be smaller than the safety margin previously described above. The advantage of a smaller safety margin is that it will identify more pixels as empty and eliminate more pixels from additional processing. There may be instances in which it is critical not to miss targets. In such critical applications, changes to a varying threshold may be such that fewer scene pixels are identified as empty pixels and eliminated than compared to less critical applications. Advantageously, in some examples of the RID approach, the varying threshold is based on the criticality of not missing any targets.

Another example of the score revising module 310 calculates an upper bound for all the unevaluated terms, and thus an upper bound, $MF_{MAX}$, for the full (final) dimension target score. The identifying module 315 compares the upper bound ($MF_{MAX}$) to the full dimension target score threshold at each loop to eliminate certain scene pixels and select scene pixels for continued evaluation. In this example, the same threshold is used for each iteration and the maximum score drops as more terms are added to the intermediate target score and the uncertainty in the score decreases.

A key feature of the bounding scheme is based on realizing that the full (final) dimension target score value can be quickly calculated from the terms that have already been evaluated for certain assumptions about the spectral shape of the unevaluated terms. For example, a rigorous upper bound can be calculated by assuming the entire remaining pixel whitened magnitude, denoted by e, is in the direction that maximizes the MFNUM, which is given by the maximum of $t_i$ divided by $\lambda_i$ for the unused terms. Note, the sorting of eigenvectors and eigenvalues based on their contributions to the SCR will mean eigenvalues are not in descending order of importance.

The rigorous upper bound, $MFNUM_{MAX}$, is shown in equation 8 and is useful to ensure examples of the RID approach do not eliminate pixels that could contain targets.

$$MFNUM = MFNUM_M + \sum_{i=M+1}^{D} \frac{p_i t_i}{\lambda_i} < MF_M + e * \max\left(\frac{t_i}{\lambda_i}\right)_{i=M=1:D} = \quad (8)$$

$$MFNUM_{MAX}$$

where $MFNUM_M = \sum_{i=1}^{M} \frac{p_i t_i}{\lambda_i}$ and $e^2 = \sum_{i=M+1}^{D} p_i^2 = X^2 - \sum_{i=1}^{M} p_i^2$ and $$X^2 = \sum_{i=1}^{D} (x_i - \mu_i)^2$$

This example of the RID approach requires more calculations primarily because it calculates a rigorous bound (e.g., the upper bound, $MF_{MAX}$) on the maximum target score and requires evaluation of more terms than the other examples. However, the benefit of this example is that it is guaranteed to make exactly the same decisions as the full dimension target score but with fewer computations. Therefore, this example of the RID approach may be favored in critical applications in which missed targets are tolerated less.

In another example of an upper MF bound, a less stringent bound can be estimated that incorporates a consideration of the ACE score. A convenient example the RID approach includes both MF and ACE target scores because the MF score measures the projection of a whitened spectrum along the direction of the whitened reference spectrum, while ACE score measures the cosine of the angle between the whitened pixel spectrum and whitened reference spectrum. Therefore, the rigorous upper bound of MF is associated with a spectrum that is not necessarily similar in shape to the reference, but merely has a very large projection in one direction. Since an improved detection approach would use both MF and ACE in the detection score, the upper bound should include an appropriate balance of maximum MF (in the direction of the largest SCR term) versus maximum ACE (the same shape in all dimensions as the remaining SCR terms).

An example of an approximate MF upper bound with a high ACE score can be derived by assuming that the remaining unevaluated terms of the pixel match the shape of the unevaluated terms of the target reference. Thus an approximate MF numerator upper bound, denoted $MFNUM_{BIG}$ is given in equation 9.

$$MFNUM_{BIG} = \quad (9)$$

$$MFNUM_M + \alpha * \sum_{i=M+1}^{D} \frac{t_i^2}{\lambda_i} = MFNUM_M + e \frac{\left(SCR - \sum_{i=1}^{M} \frac{t_i^2}{\lambda_i}\right)}{\sqrt{S^2 - \sum_{i=1}^{M} t_i^2}}$$

where $MFNUM_M = \sum_{i=1}^{M} \frac{p_i t_i}{\lambda_i}$ and $e^2 = \sum_{i=M+1}^{D} p_i^2 = X^2 - \sum_{i=1}^{M} p_i^2$ and $$X^2 = \sum_{i=1}^{D} (x_i - \mu_i)^2 \text{ and } S^2 = \sum_{i=1}^{D} (s_i - \mu_i)^2$$

These two bounding examples arise because the sum of the terms of the whitened spectra, $p_i$, are known, but not the individual terms. Therefore making an assumption about the relative size of the individual terms, which has been referred to as the shape of the spectrum, allows one to estimate the full dimension target score, if the shape assumption is correct. Therefore, the preceding equations calculate the score by making 2 assumptions that will lead to high target scores, thereby estimating 2 bounding estimates of a high target score. The first assumption, with all remaining p magnitude in the term with maximum MF score, i.e., 100% of the remaining magnitude is in this term, yields a rigorous upper bound for the MF score of the pixel; however, a pixel with this p spectrum could have a low ACE score. The second assumption calculates the MF score for a pixel with the highest possible ACE score, ie 100% of the remaining magnitude is distributed among all the remaining terms with the same relative sizes as the whitened target reference; however, this pixel would have an MF score lower than the rigorous upper bound. Additional approaches to utilize both MF and ACE scores are possible. For example one could assume 50% of the magnitude is in the term with the maximum MF score and the remaining 50% is distributed among all remaining terms in a way that would maximize the ACE score.

Figure 5:
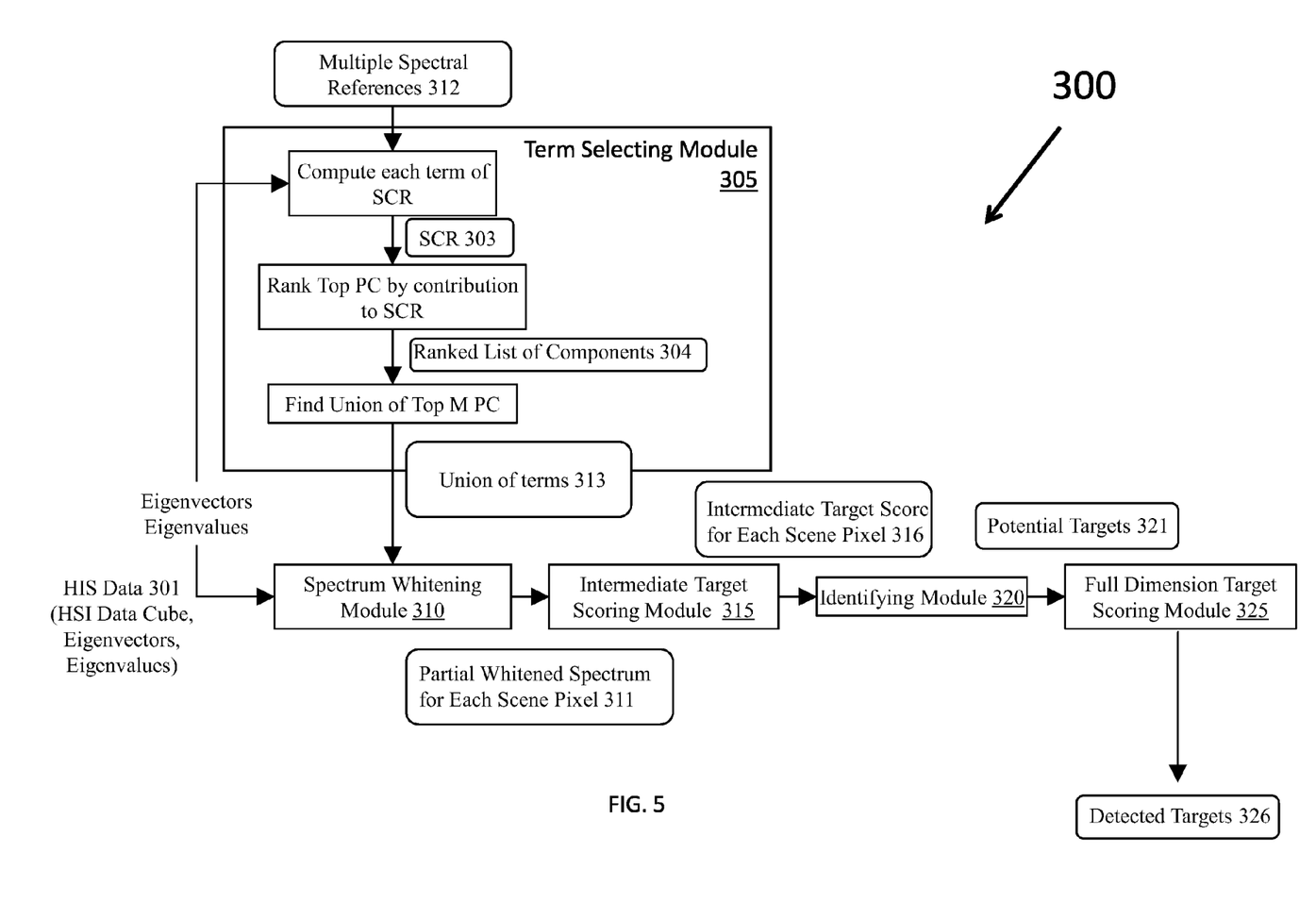
FIG. 5 is a functional block diagram of the target detector of FIG. 3 processing multiple spectral references.

FIG. 5 shows the target detector 300 implementing an example of the RID approach using multiple spectral references to detect multiple targets in scene pixels in a hyperspectral scene, which saves time and work. Before discussing the figure in detail, in order to better appreciate the time and work saving features of the approach, consider the following example of computing intermediate target scores for a plurality of scene pixels for two spectral references, SR1 and SR2.

The highest ranked terms of SR1 are 7, 5, 12, 10 and the highest ranked terms of SR2 are 5, 9, 10, 13. The union of these two sets of terms is 5, 7, 9, 10, 12, 13. Note, this is typical for a real-world example. The highest ranking eigenvalues are usually not the first few terms because those are the ones with large scene variation, which disguises the target. This is one of the reasons why it is advantageous, in terms of time and effort, not to calculate a full set of terms. Also, when multiple spectral references are similar, it is likely that the spectral references use some of the same eigenvalues but the eigenvalues could be a different order.

As discussed above, an example of the intermediate target scoring process includes whitening each scene pixel in the plurality of scene pixels and taking the dot product of the whiten scene pixel spectrum with the whiten spectral reference. To perform step one of the scoring process, the approach uses the union of the two sets of top ranked terms to do the scene pixel whitening. For each scene pixel, the approach creates a whitened scene pixel spectrum for terms 5, 7, 9, 10, 12, 13.

To perform step two of the scoring process, for a given scene pixel, the approach computes the intermediate target score for the scene pixel for SR1 using terms 7, 5, 12, 10 from the whitened scene pixel spectrum (which is just a portion of the terms evaluated in the step one of the scoring process) and corresponding terms 7, 5, 12, 10 from the whitened spectrum for SR1.

For SR2, the approach computes the intermediate target score for each scene pixel using terms 5, 9, 10, 13 from the whitened scene pixel spectrum (which is just a portion of the terms evaluated in the step one of the scoring process above) and corresponding terms 5, 9, 10, 13 from the whitened spectrum SR2. Because terms 5 and 10 of each scene pixel are already whitened from computing the score with respect to SR1, the approach saves time and work by reusing whitened terms 5 and 10 in calculating the score with respect to SR2.

Turning now to detailed discussion of FIG. 5, the target detector 300 is provided with multiple spectral references 312. The term selecting module 305 determines terms needed to calculate the top M terms for each of the spectral references 312. The term selecting module 305 finds a union of multiple sets of top M terms. The term selecting module 305 outputs a set of U terms 313 to be used in the intermediate target score calculations.

The spectrum whitening module 310 computes a partial whitened spectrum for each scene pixel using the U terms 313. The U terms 313 include the highest scoring eigenvectors and eigenvalues from the SCR calculation of the multiple spectral references. The spectrum whitening module 310 outputs a partial whitened spectrum for each of the scene pixels 311.

The intermediate target scoring module 315 computes an intermediate target score (partial MF) for each scene pixel 316 in the plurality of scene pixels for each of the spectral references 312. In one example of intermediate target scoring module 315, to compute an intermediate target score for a scene pixel for a given spectral reference, the intermediate target scoring module 315 selects the appropriate M terms from the set U terms 313 (i.e., a subset of the set U terms 313). To compute an intermediate target score for the scene pixel for another spectral reference, the intermediate target scoring module 315 selects another appropriate M terms from the set U terms (i.e., another subset of the set U terms 313) that includes some terms from the previous calculation. As demonstrated in the example above, some examples of the RID approach save time and work by advantageous reusing the previously calculated whitened scene pixel spectrum.

Another example of the intermediate target scoring module 315 computes the intermediate target score 316 for each of the scene pixels for one spectral reference using the union of terms 313 from the whitened scene pixel spectrum and corresponding terms from the whitened spectrum for spectral reference. For another spectral reference, the intermediate target scoring module 315 computes the intermediate target score 316 for each of the scene pixels using the union of terms 313 from the whitened scene pixel spectrum and corresponding union of terms from the whitened spectrum spectral reference.

The intermediate target scoring module 315 compares each pixel intermediate target score to a threshold to identify empty scene pixels. As described above with reference to FIG. 3, results are passed to the full dimension target scoring module 325 to further process remaining scene pixels and to compute full dimension target scores for the remaining scene pixels to detect targets.

Figure 6:
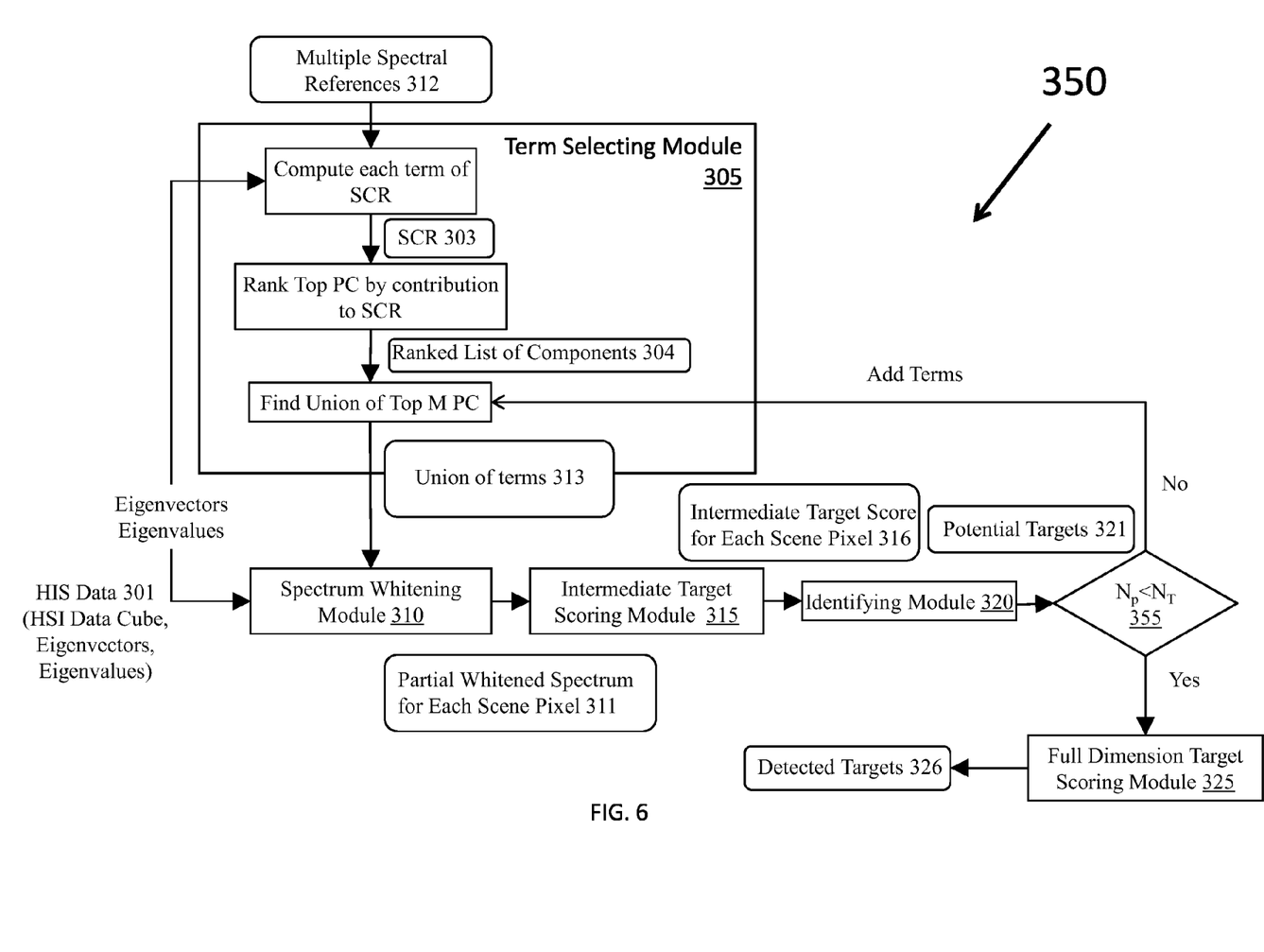
FIG. 6 is a functional block diagram of the target detector of FIG. 4 processing multiple spectral references.

FIG. 6 shows the target detector 350 implementing an example of the RID approach processing multiple target references, iteratively. Similar to the examples discussed above with reference to FIG. 5, the approach uses M terms for a first spectral reference to calculate M terms of the whitened scene pixel spectrum and to generate an intermediate target score (e.g., partial MF score). The approach finds the top M components of the next spectral reference. The approach reuses any terms of the previously calculated whitened scene pixel spectra that are common to the new spectral reference and calculates any new terms for different top M components of the whitened scene pixel spectra. The approach uses the new current set of top M components to calculate an intermediate target score (e.g., partial MF score) for the new spectral reference. The approach repeats until the multiple spectral reference are processed, reusing any previously calculated terms of the whitened scene pixel spectrum and calculating only the new terms not previously used.

If the number of potential targets is large (e.g., as determined by a set number or a set fraction of the plurality of scene pixels are identified as empty scene pixels, the intermediate target scoring module 315 calculates a few more of the remaining terms of the target score (adding terms to the target equation) to compute an updated intermediate target score for those remaining scene pixels.

When the number of remaining scene pixels is sufficiently small or the number of iterations of intermediate scoring is sufficiently large, results are passed to the full dimension target scoring module 325 to further process remaining scene pixels and to compute full dimension target scores for the remaining scene pixels to detect targets.

The above-described systems and methods can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The target detector 300 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., target detector 300) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for detecting a target in a scene pixel of a hyperspectral scene, the target having a spectrum similar to a known spectral reference, the method comprising:

in a target detector provided with hyperspectral imaging data for a plurality of scene pixels of a hyperspectral scene and one or more spectral references each corresponding to a target, wherein the hyperspectral imaging data being provided from a hyperspectral sensor and a given spectral references includes a full set of terms representing spectrum whitened by transforming the spectrum using a spectral covariance of the hyperspectral scene, and wherein each term is indexed by an eigenvector and eigenvalue of the spectral covariance used to calculate that term:

for a given spectral reference:
  computing a signal-to-clutter ratio (SCR) including a full set of SCR terms, the SCR represents the probability of detecting a target corresponding to the spectral reference in the hyperspectral scene;
  ranking the full set of SCR terms based on the contribution of each of the SCR terms to the computed SCR;
  based on the ranking, selecting indices of eigenvalues that correspond to a portion of the full set of SCR terms;
with respect to the given spectral reference, for each scene pixel in the plurality of scene pixels:
  calculating a partial whitened scene pixel spectrum including terms with the selected eigenvalue indices;
  computing an intermediate target score using a target score equation including the terms of the partial whitened scene pixel spectrum and terms of the whitened spectral reference spectrum with the selected eigenvalue indices;
comparing the intermediate target score to a threshold;
identifying scene pixels having intermediate target scores less than the threshold as empty scene pixels that do not include targets;
if a number of empty scene pixels is less than a specified fraction of a total number of scene pixels and a number of intermediate target scores computed is less than a counter, then:
  updating the partial whitened scene pixel spectrum calculation to include a term with an eigenvalue index previously not selected;
  updating the target score equation to include terms of the updated partial whitened scene pixel spectrum and terms of the whitened spectral reference spectrum to form an updated target score equation;
for each scene pixel remaining in the plurality of scene pixels, computing an updated intermediate target score using the updated target score equation;
comparing the updated intermediate target scores to an updated threshold, the updated threshold being greater in value than the threshold;
identifying scene pixels having updated intermediate target scores less than the updated threshold as empty scene pixels that do not include targets;
if the number of empty scene pixels is greater than or equal to the specified fraction of the total number of scene pixels or the number of intermediate target scores computed is greater than or equal to the counter, for each scene pixel remaining in the plurality of scene pixels, computing a full dimension target score based on a full dimension target score equation including a full set of terms; and
declaring which scene pixels include targets corresponding to the given spectral reference based on comparisons of the computed full dimension target score to a full dimension target score threshold, the full dimension target score threshold being greater in value than the threshold and the updated threshold.

2. The method of claim 1 wherein the hyperspectral imaging data includes M principal components of the hyperspectral scene;
  wherein computing the intermediate target score includes computing the intermediate target score from a subset of the M principal components, the remaining principal components are not used to compute the intermediate target score;
  wherein updating the target equation includes updating the target equation to include one or more of the unused principal components to form the updated target equation; and
  wherein computing the full dimension target score includes computing the full dimension target score based on the M principal components.

3. The method of claim 1 wherein the hyperspectral imaging data includes a plurality of average bands, which are derived by averaging the HSI spectrum of each scene pixel in the plurality of scene pixels;
  wherein computing the intermediate target score includes computing the intermediate target score from a subset of the plurality of average bands, the remaining average bands are not used to compute the intermediate target score;
  wherein updating the target equation includes updating the target equation to include one or more of the average bands to form the updated target equation; and
  wherein computing the full dimension target score includes computing the full dimension target score based on the plurality of average bands.

4. The method of claim 1 wherein the hyperspectral imaging data includes N coefficients for each scene pixel, which are derived by unmixing N basis vectors from a spectral vector associated each scene pixel;
  wherein computing the intermediate target score includes computing the intermediate target score from a subset of the N coefficients, the remaining coefficients are not used to compute the intermediate target score;
  wherein updating the target equation includes updating the target equation to include one or more of the unused coefficients to form the updated target equation; and
  wherein computing the full dimension target score includes computing the full dimension target score based on the N coefficients.

5. The method of claim 1 further comprising, given a plurality of spectral references each associated with a full set of SCR terms:

finding a union of the eigenvalue indices selected for the plurality of spectral references, the union of selected eigenvalue indices corresponding to a portion of the full sets of SCR terms;

wherein the partial whitened spectrum calculation for each scene pixel in the plurality of scene pixels includes terms associated the union of selected eigenvalue indices; and wherein the intermediate target score computation for each scene pixel in the plurality of scene pixels, with respect to a given spectral reference, includes terms of the partial whitened spectrum for a subject scene pixel and terms of the whitened spectrum for the given spectral reference associated with the union of selected eigenvalue indices.

6. The method of claim 1 further comprising, given a plurality of spectral references each associated with a full set of SCR terms:

finding a union of the eigenvalue indices selected for the plurality of spectral references, the union of selected eigenvalue indices corresponding to a portion of the full sets of SCR terms;

wherein the partial whitened spectrum calculation for each scene pixel in the plurality of scene pixels includes terms associated the union of selected eigenvalue indices; and wherein the intermediate target score computation for each scene pixel in the plurality of scene pixels, with respect to a given spectral reference, includes a portion of the terms of the partial whitened spectrum for a subject scene pixel that match the terms of the whitened spectrum for the given spectral reference associated with the selected eigenvalue indices.

7. The method of claim 1 further comprising eliminating the empty scene pixels from the plurality of scene pixels.

8. The method of claim 1 further comprising revising the intermediate target score to form a revised target score and wherein comparing includes comparing the revised target score to a varying threshold, the varying threshold being based, at least in part, on a portion of the full set of SCR terms not yet evaluated.

9. The method of claim 8 wherein revising further includes approximating the unevaluated terms of the target equation to form a score corresponding with unevaluated terms; and
adding the score to the intermediate target score to form the revised target score.

10. The method of claim 8 wherein revising further includes calculating an upper bound of the unevaluated terms of the target equation;
adding the upper bound to the intermediate target score to form the revised target score; and
comparing the revised target score to a threshold used to compare a full dimension target score.

11. The method of claim 1 wherein computing the intermediate target score includes taking the dot product of the partial whitened scene pixel spectrum with the whitened spectral reference spectrum with the selected eigenvalue indices.

12. A system for detecting a target in a scene pixel of a hyperspectral scene, the target having a spectrum similar to a known spectral reference, the system comprising:
a memory having computer executable instructions thereupon;
at least one interface receiving a hyperspectral imaging data for a plurality of scene pixels of a hyperspectral scene and one or more spectral references each corresponding to a target, wherein the hyperspectral imaging data being provided from a hyperspectral sensor and a given spectral references includes a full set of terms representing spectrum whitened by transforming the spectrum using a spectral covariance of the hyperspectral scene, and wherein each term is indexed by an eigenvector and eigenvalue of the spectral covariance used to calculate that term; and
a target detector coupled to the memory and the at least one interface, the computer executable instructions when executed by the target detector cause the target detector to:
for a given spectral reference:
compute a signal-to-clutter ratio (SCR) including a full set of SCR terms, the SCR represents the probability of detecting a target corresponding to the spectral reference in the hyperspectral scene;
rank the full set of SCR terms based on the contribution of each of the SCR terms to the computed SCR;
based on the ranking, select indices of eigenvalues that correspond to a portion of the full set of SCR terms;
with respect to the given spectral reference, for each scene pixel in the plurality of scene pixels:
calculate a partial whitened scene pixel spectrum including terms with the selected eigenvalue indices;
compute an intermediate target score using a target score equation including the terms of the partial whitened scene pixel spectrum and terms of the whitened spectral reference spectrum with the selected eigenvalue indices;
compare the intermediate target score to a threshold;
identify scene pixels having intermediate target scores less than the threshold as empty scene pixels that do not include targets;
if a number of empty scene pixels is less than a specified fraction of a total number of scene pixels and a number of intermediate target scores computed is less than a counter, then:
update the partial whitened scene pixel spectrum calculation to include a term with an eigenvalue index previously not selected;
update the target score equation to include terms of the updated partial whitened scene pixel spectrum and terms of the whitened spectral reference spectrum to form an updated target score equation;
for each scene pixel remaining in the plurality of scene pixels, compute an updated intermediate target score using the updated target score equation;
compare the updated intermediate target scores to an updated threshold, the updated threshold being greater in value than the threshold;
identify scene pixels having updated intermediate target scores less than the updated threshold as empty scene pixels that do not include targets;
if the number of empty scene pixels is greater than or equal to the specified fraction of the total number of scene pixels or the number of intermediate target scores computed is greater than or equal to the counter, for each scene pixel remaining in the plurality of scene pixels, compute a full dimension target score based on a full dimension target score equation including a full set of terms; and
declare which scene pixels include targets corresponding to the given spectral reference based on comparisons of the computed full dimension target score to a full dimension target score threshold, the full dimension target score threshold being greater in value than the threshold and the updated threshold.

13. The system of claim 12, given a plurality of spectral references each associated with a full set of SCR terms, the target detector further caused to find a union of the eigenvalue indices selected for the plurality of spectral references, the union of selected eigenvalue indices corresponding to a portion of the full sets of SCR terms;
   wherein the partial whitened spectrum calculation for each scene pixel in the plurality of scene pixels includes terms associated the union of selected eigenvalue indices; and
   wherein the intermediate target score computation for each scene pixel in the plurality of scene pixels, with respect to a given spectral reference, includes a portion of the terms of the partial whitened spectrum for a subject scene pixel that match the terms of the whitened spectrum for the given spectral reference associated with the selected eigenvalue indices.

14. The system of claim 12 wherein the target detector further caused to eliminate the empty scene pixels from the plurality of scene pixels.

15. The system of claim 12 wherein the target detector further caused to revise the intermediate target score to form a revised target score and wherein comparing includes comparing the revised target score to the threshold.

16. A tangible non-transitory computer-readable storage medium having computer readable instructions stored therein for detecting a target in a scene pixel of a hyperspectral scene, the target having a spectrum similar to a known spectral reference, which when executed by one or more processors provided with a hyperspectral imaging data for a plurality of scene pixels of a hyperspectral scene and one or more spectral references each corresponding to a target, wherein hyperspectral imaging data being provided from a hyperspectral sensor and a given spectral references includes a full set of terms representing spectrum whitened by transforming the spectrum using a spectral covariance of the hyperspectral scene, and wherein each term is indexed by an eigenvector and eigenvalue of the spectral covariance used to calculate that term, cause the one or more processors to:
   for a given spectral reference:
      compute a signal-to-clutter ratio (SCR) including a full set of SCR terms, the SCR represents the probability of detecting a target corresponding to the spectral reference in the hyperspectral scene;
      rank the full set of SCR terms based on the contribution of each of the SCR terms to the computed SCR;
      based on the ranking, select indices of eigenvalues that correspond to a portion of the full set of SCR terms;
   with respect to the given spectral reference, for each scene pixel in the plurality of scene pixels:
      calculate a partial whitened scene pixel spectrum including terms with the selected eigenvalue indices;
      compute an intermediate target score using a target score equation including the terms of the partial whitened scene pixel spectrum and terms of the whitened spectral reference spectrum with the selected eigenvalue indices;
   compare the intermediate target score to a threshold;
   identify scene pixels having intermediate target scores less than the threshold as empty scene pixels that do not include targets;
   if a number of empty scene pixels is less than a specified fraction of a total number of scene pixels and a number of intermediate target scores computed is less than a counter, then:
      update the partial whitened scene pixel spectrum calculation to include a term with an eigenvalue index previously not selected;
      update the target score equation to include terms of the updated partial whitened scene pixel spectrum and terms of the whitened spectral reference spectrum to form an updated target score equation;
      for each scene pixel remaining in the plurality of scene pixels, compute an updated intermediate target score using the updated target score equation;
   compare the updated intermediate target scores to an updated threshold, the updated threshold being greater in value than the threshold;
   identify scene pixels having updated intermediate target scores less than the updated threshold as empty scene pixels that do not include targets;
   if the number of empty scene pixels is greater than or equal to the specified fraction of the total number of scene pixels or the number of intermediate target scores computed is greater than or equal to the counter, for each scene pixel remaining in the plurality of scene pixels, compute a full dimension target score based on a full dimension target score equation including a full set of terms; and
   declare which scene pixels include targets corresponding to the given spectral reference based on comparisons of the computed full dimension target score to a full dimension target score threshold, the full dimension target score threshold being greater in value than the threshold and the updated threshold.

17. The tangible non-transitory computer-readable storage medium of claim 16, given a plurality of spectral references each associated with a full set of SCR terms, the one or more processors further caused to:
   find a union of the eigenvalue indices selected for the plurality of spectral references, the union of selected eigenvalue indices corresponding to a portion of the full sets of SCR terms;
   wherein the partial whitened spectrum calculation for each scene pixel in the plurality of scene pixels includes terms associated the union of selected eigenvalue indices; and
   wherein the intermediate target score computation for each scene pixel in the plurality of scene pixels, with respect to a given spectral reference, includes a portion of the terms of the partial whitened spectrum for a subject scene pixel that match the terms of the whitened spectrum for the given spectral reference associated with the selected eigenvalue indices.

18. The tangible non-transitory computer-readable storage medium of claim 16, given a plurality of spectral references each associated with a full set of SCR terms, the one or more processors further caused to find a union of the eigenvalue indices selected for the plurality of spectral references, the union of selected eigenvalue indices corresponding to a portion of the full sets of SCR terms;
   wherein the partial whitened spectrum calculation for each scene pixel in the plurality of scene pixels includes terms associated the union of selected eigenvalue indices; and
   wherein the intermediate target score computation for each scene pixel in the plurality of scene pixels, with respect to a given spectral reference, includes a portion of the terms of the partial whitened spectrum for a subject scene pixel that match the terms of the whitened spectrum for the given spectral reference associated with the selected eigenvalue indices.

19. The tangible non-transitory computer-readable storage medium of claim 16 wherein the one or more processors further caused to eliminate the empty scene pixels from the plurality of scene pixels.

20. The tangible non-transitory computer-readable storage medium of claim 16 wherein the one or more processors further caused to revise the intermediate target score to form a revised target score and wherein comparing includes comparing the revised target score to the threshold.

* * * * *